(12) United States Patent
Emerson, III

(10) Patent No.: US 7,327,720 B2
(45) Date of Patent: Feb. 5, 2008

(54) INTEGRATED TELEPHONE CENTRAL OFFICE SYSTEMS FOR INTEGRATING THE INTERNET WITH THE PUBLIC SWITCHED TELEPHONE NETWORK

(76) Inventor: Harry E. Emerson, III, 27 Garden Ct., Succasunna, NJ (US) 07876

( * ) Notice: Subject to any disclaimer, the term of this patent is extended or adjusted under 35 U.S.C. 154(b) by 811 days.

(21) Appl. No.: 10/195,695

(22) Filed: Jul. 15, 2002

(65) Prior Publication Data

US 2003/0016806 A1 Jan. 23, 2003

Related U.S. Application Data

(60) Provisional application No. 60/306,293, filed on Jul. 18, 2001.

(51) Int. Cl.
*H04L 12/28* (2006.01)
*H04L 12/56* (2006.01)
(52) U.S. Cl. .................. 370/352; 370/353; 370/401
(58) Field of Classification Search ........ 370/351–356, 370/401, 400
See application file for complete search history.

(56) References Cited

U.S. PATENT DOCUMENTS

| | | | |
|---|---|---|---|
| 5,724,412 A | 3/1998 | Srinivasan | 379/93.23 |
| 5,805,587 A | 9/1998 | Norris et al. | 370/352 |
| 5,828,666 A | 10/1998 | Focsaneanu et al. | 370/389 |
| 5,907,547 A | 5/1999 | Foladare et al. | 370/352 |
| 5,937,041 A | 8/1999 | Cardillo, IV et al. | 379/93.25 |
| 5,995,606 A | 11/1999 | Civanlar et al. | 379/201 |
| 6,031,904 A | 2/2000 | An et al. | 379/201 |
| 6,061,347 A | 5/2000 | Hollatz et al. | 370/352 |
| 6,157,648 A | 12/2000 | Voit et al. | 370/401 |
| 6,185,194 B1 | 2/2001 | Musk et al. | 370/260 |
| 6,192,045 B1 | 2/2001 | Williams et al. | 370/352 |
| 6,233,234 B1* | 5/2001 | Curry et al. | 370/356 |
| 6,243,373 B1 | 6/2001 | Turock | 370/352 |
| 6,278,704 B1 | 8/2001 | Creamer et al. | 370/352 |
| 6,285,671 B1 | 9/2001 | Bossemeyer, Jr. et al. | 370/352 |

(Continued)

*Primary Examiner*—Edan Orgad
*Assistant Examiner*—Chuong Ho
(74) *Attorney, Agent, or Firm*—Ernest D. Buff & Associates, LLC.; Ernest D. Buff

(57) ABSTRACT

Telephone central office-switching system integrated interface devices such as those for DSL, Voice over IP, cable-TV, fixed wireless, and Internet capable wireless cellular are further integrated into integrated interface device systems. Such systems share common facilities including a router function, messaging function, and a common voice communications channel. The messaging function is arranged to provide call setup and associated messages which enable a calling device which calls an Integrated Device to establish an Internet communication simply by dialing the telephone number of the Integrated Device. Integrated Devices have both an Internet connection and a telephone number; the Internet connection has an associated IP address. Call setup messages include telephone numbers and IP addresses. The integrated router function is enabled to edge route Internet data traffic within the system and to and from other such systems, without the data traversing further into the Internet. Further integration is achieved by incorporating the associated central office switch into the integrated assembly, forming an integrated central office system. Conversion of the switch into a pure packet switch which packetizes analog voice traffic into IP format enables voice, data, and inter-system messaging traffic to be edge routed via the integral routing function, transforming the PSTN to a network based entirely on Internet protocols.

25 Claims, 6 Drawing Sheets

U.S. PATENT DOCUMENTS

| | | | |
|---|---|---|---|
| 6,292,480 B1 | 9/2001 | May | 370/352 |
| 6,307,930 B1 | 10/2001 | Mayer | 379/215.01 |
| 6,324,280 B2 | 11/2001 | Dunn et al. | 379/230 |
| 6,327,267 B1 | 12/2001 | Valentine et al. | 370/466 |
| 6,333,928 B1 * | 12/2001 | Schaal et al. | 370/360 |
| 6,333,931 B1 | 12/2001 | LaPier et al. | 370/385 |
| 6,335,936 B1 | 1/2002 | Bossemeyer, Jr. et al. | 370/420 |
| 6,345,047 B1 | 2/2002 | Regnier | 370/352 |
| 6,381,320 B1 | 4/2002 | Creamer et al. | 379/201.1 |
| 6,404,764 B1 | 6/2002 | Jones et al. | 370/352 |
| 6,614,781 B1 * | 9/2003 | Elliott et al. | 370/352 |
| 6,671,262 B1 * | 12/2003 | Kung et al. | 370/260 |
| 6,842,447 B1 * | 1/2005 | Cannon | 370/352 |
| 7,145,898 B1 * | 12/2006 | Elliott | 370/352 |
| 2001/0010690 A1 | 8/2001 | Shen | 370/352 |
| 2001/0012285 A1 | 8/2001 | Shaharabani et al. | 370/352 |
| 2001/0032234 A1 | 10/2001 | Summers et al. | 709/201 |
| 2001/0055299 A1 | 12/2001 | Kelly | 370/352 |
| 2002/0024943 A1 | 2/2002 | Karaul et al. | 370/338 |
| 2002/0041590 A1 | 4/2002 | Donovan | 370/352 |
| 2002/0057672 A1 | 5/2002 | Komuro | 370/352 |
| 2002/0057677 A1 | 5/2002 | Katzschner et al. | 370/352 |
| 2002/0075844 A1 * | 6/2002 | Hagen | 370/351 |
| 2007/0073805 A1 * | 3/2007 | Jorgensen | 709/203 |

* cited by examiner

INTEGRATED TELEPHONE CENTRAL OFFICE SYSTEMS FOR INTEGRATING THE INTERNET WITH THE PUBLIC SWITCHED TELEPHONE NETWORK

This application claims the benefit of U.S. Provisional Application Ser. No. 60/306,293, filed Jul. 18, 2001, entitled "Integrated Central Office Systems For Integrating The Internet With The Public Switched Telephone System".

BACKGROUND OF THE INVENTION

1. Field of the Invention

The present invention relates to the Internet and the Public Switched Telephone Network (PSTN); and more particularly to the integration of the Internet with the PSTN in a manner such that systems, services, and devices on either can communicate with systems, services, and devices on the other, so that the full benefit and unique characteristics of either network are available to these communications.

2. Description of the Prior Art

The Internet and the PSTN constitute discrete, independent networks from an architectural and operational perspective. Much is written about both networks, especially in terms of their architecture and operation. Consequently, the specification provided herein does not reconstruct that information other than providing general background information. The term "Internet" is commonly understood and used throughout the specification and claims in a conventional way. The Internet, in general, is an assemblage of interconnected routers that provide data transport services for server computers and user devices—typically PCs. The interconnection between routers is provided by private line data circuits, the main lines of which constitutes the Internet "backbone". Internet Service Providers (ISPs) provide access to the Internet via dial up telephone lines with modems, and via dedicated arrangements such as T-1 circuits, cable modems on cable-TV systems, and DSL (Digital Subscriber Line) service.

The Internet is designed according to the Internet Protocol (IP), which provides detailed specifications for the construction, addressing, and routing of data packets (occasionally referred to as "messages" in this document). (The term "Internet Protocol" also is used loosely to refer to dozens of related protocols that are used in the Internet.) IP addresses are expressed as a series of digits separated by "dots" (periods), in the form XXX.XXX.XXX.XXX where XXX can be a number from 0 to 255. IP addresses provide a similar function on the Internet as telephone numbers provide on the PSTN. A communication with an Internet device can be established by sending a message addressed to the IP address of that device. Every device capable of communicating on the Internet has an IP address assigned to it, either permanently, or dynamically as needed. IP addresses in some environments are replaced with a proxy address; for purposes of this document, the term "IP address" shall refer to an actual IP address, or a proxy or other identifier translatable into an actual IP address. In some of these arrangements, the IP address may be indirectly associated with the device. For example, in a wireless handset arrangement, the provider's complex might provide Internet connections for wireless handsets on a proxy basis wherein the complex keeps track of IP number assignments used for each handset, but communicates with each handset based on a serial number or other unique identifying scheme. The same goal is accomplished, i.e. an Internet capable handset gets its own IP address, but with one level of indirection. In other arrangements proxies or agents act on behalf of a client system and substitute the proxy's IP addresses for the addresses of the client devices—in these arrangements the combination of the proxy address and the original client system address resolve to provide a unique IP address for each client system. Internet data packets contain the IP address of both the sending system and receiving system (the source and destination, respectively). Since IP messages always contain the IP addresses of both the sending and destination device, when a device receives an Internet message from a sending device, it will then possess the IP address of the sender and can send messages in reply. The two devices can then engage in a communication across the Internet since each has the IP address of the other.

Routers have internal tables that provide routing instructions, which relate IP addresses to the available data circuits and access lines. A router functions by reading the destination address in a data packet, and then forwarding the data packet on one of its data circuits or access lines according to the rules of the routing tables. A data packet gets forwarded from one router to another, pinballing its way across the Internet until it reaches a router that is connected to the destination system.

The term "Public Switched Telephone Network", or PSTN, as used herein means the national and international telephone network, actuated when a user dials a telephone number associated with any other phone, causes it to ring, and if answered, is enabled to carry on a voice communication (or, more properly, a "voice grade" communication) with the person (or system) at the remote location. Just as the Internet is comprised of an aggregation of interconnected routers, the PSTN is comprised of an aggregation of interconnected local and long distance telephone switching systems. The local switching systems, referred to as telephone company (telco) central offices (CO), provide telephone subscriber services in a geographic area.

As used herein, the term "telephone central office switching system" refers generically to a class of systems, typically owned by the operating telephone company in any given area, which provide "local" telephony services to telephone subscribers in that area. Generally, the operating telephone company provides the "local loop" cabling and wiring from its central office to the physical location of each of its subscribers (a "telephone circuit", or a "line"). A telephone central office might house several switching systems of this class, each serving up to 100,000 subscribers or more. The central office represents the hub of a wheel having thousands of spokes, each spoke being a physical pair of wires providing telephone service to a subscriber in that area. Subscribers in any given area are provided service by the central office situated in the center of the area. Outside that area the wires home to other similarly situated central offices. The telephone company connects the telephone circuit of a subscriber to an access connection on the switching system, and assigns a telephone number to that circuit. In operation, the switching system (or just "switch") provides battery voltage on the phone line, sends dial tone to the subscriber line when the subscriber's phone goes off hook, receives the dialed digits, and then routes the call according to its internal instructions based on the called number.

Common manufactured switching systems of this class include the Lucent Technologies 5ESS, and the Nortel DMS100. All telephone central office-switching systems around the world are interconnected by "trunk" circuits that carry voice or voice grade telephone calls between systems, and most (if not all) such systems are also interconnected by a messaging network referred to as CCS/SS7 (Common Channel Signaling/Signaling System 7), or just SS7. Long distance calls to telephones outside of the area served by the local telephone company are typically routed to a long distance carrier, such as AT&T, MCI, or Sprint in the USA. The telephone central office switches connect via trunking and messaging circuits to a class of switching system referred to as a "toll switch", such as the Lucent Technologies 4ESS, operated by a long distance carrier. Toll switches normally do not provide local telephone services.

In the current state of the art there are two inter-related messaging systems utilized within the PSTN. These are: (i) SS7; and (ii) ISDN (Integrated Services Digital Network), which incorporates a messaging system as an element of a broader product and service architecture. The SS7 messaging system extends through the major elements and systems of the PSTN, connecting virtually all of the local and long distance central offices, and carries call management (or call control) messages relating to call setup and disconnection and similar call management functions. Whereas the SS7 messaging system is oriented toward providing messaging communications among and between the PSTN switching systems, the ISDN messaging system is oriented toward extending the PSTN messaging system to the end devices such as telephones and office telephone systems. Rather than going off hook and drawing dial tone from the local central office switching system to initiate a call, as analog phones do, an ISDN phone sends a packetized digital call setup message to the switching system to initiate a call. Both the ISDN messaging system and the SS7 messaging system are based on the X.25/X.75 communications protocols. ISDN messages are carried on the SS7 messaging network. Disadvantageously, neither the SS7 nor the ISDN messaging systems carry any messages related to creating an Internet communication by one device dialing the telephone number of another.

The ISDN and SS7 messaging systems are call setup and call management (or call control) systems which carry a spectrum of messages, message responses, message acknowledgements, and the like, such as are necessary to conduct telecommunications. A full listing of all the message types that might be employed in a robust telecommunications environment has not been attempted herein, since that depth of information is not necessary to convey the essential elements of this invention. A brief listing of those message types include: (i) call setup request messages which convey dialing and associated information; (ii) busy signal messages telling the calling device to deliver a busy signal to the user; (iii) audible ring back messages telling the calling device to deliver "pacifier" ringing to the user; (iv) call request acceptance or rejection messages (v) call connect messages; (vi) call disconnect messages; (vii) switchhook flash messages; (viii) call transfer request messages; (ix) call conference messages; (x) call waiting messages; (xi) Caller-ID and Call Waiting-ID messages; and (xii) call forwarding messages to redirect a call to another device. In addition to these messages, a variety of other messages would be employed to indicate information like "network busy", "invalid telephone number dialed", and the like.

Conventional communication vehicles comprise computers and telephones. Computers typically have telephone lines attached to them, and telephones oftentimes have computers attached to them; but there is no true integration that enables the blending of the Internet and the PSTN. The level of integration that is presently attained permits a computer to use a phone line to dial into the Internet. Once on the Internet, the computer can access another computer by entering its Internet Protocol (IP) address into application software such as a browser.

The full benefits of integrated communications are not presently attained with conventional Internet and telecommunications environments. There exists a class of devices, such as those for Voice over IP, DSL, cable TV, fixed wireless, Internet capable wireless cellular, and similar distribution systems, which provide Internet and telephony services to client devices, such as phones and PCs, by providing an interface to the telephone company central office switching system. The environments of Voice over IP service and DSL service are illustrative of current telephony environments in relationship to the switching system that serves them. Such environments are addressed herein initially by examining the current state of the art of these systems.

In one aspect, the systems described herein relate to Voice over IP service. The term IP refers to the "Internet Protocol", the basic protocol of the Internet, while the term Voice over IP refers to sending digitized voice across the Internet using the IP protocol. Several companies provide discount rate phone calls using "Voice over IP" (VoIP) technology, wherein a long distance call of a client, typically a Personal Computer (PC) user, is carried over the Internet to a VoIP interface device in the vicinity of the called party. Such VoIP technology avoids the charges associated with placing a long distance call with a traditional long distance carrier. The interface device dials a local call on the PSTN to complete the connection for the VoIP client. Hence, the call travels partially over the Internet and partially over the PSTN. A VoIP software application at the client device digitizes the user's voice and sends that as data messages across the Internet to the VoIP interface device. The VoIP interface device in turn converts the data messages to analog signals that are output onto the analog phone line. In the reverse direction, the VoIP interface device receives analog signals from the dialed phone and converts those analog signals to digital messages, which it sends across the Internet to the VoIP client. The VoIP software at the client converts those digital messages to analog signals, which are output to the user via speakers.

In another aspect, the systems described herein relate to DSL service. An Internet access technology currently deployed is referred to as DSL service. (The original acronym was ADSL, for Asynchronous Digital Subscriber Line.) Although there are some variations on the technology (now generically referred to as "xDSL"), it essentially involves an analog telephone line supplemented by a high frequency carrier signal superimposed on the telephone line by a pair of modems—one at the subscriber location, and one at the telephone company central office. The DSL carrier signal can carry high-speed data concurrently over the same phone line without interfering with the analog phone service. Other than being carried by the same physical wires, the phone line has no relationship to the DSL Internet service.

In another instance, the matter to be discussed relates to virtual phone service provided via cable-TV. Cable-TV service has been used to provide high-speed Internet access—the popular "cable modem" service. In addition, there are a number of current activities related to delivering alternative provider telephone service via the cable-TV distribution system. Similar to the Internet access service arrangement, the telephony service arrangement utilizes a "cable modem" to transmit and receive voice grade telephone calls. Other than being carried by the same physical cable, telephone service provided by cable-TV has no relationship to the cable modem Internet service.

A related matter is that of virtual phone service provided by the so-called fixed wireless arrangement, currently undergoing field trials in some areas, and by the newly introduced cellular telephone service with Internet access. Although these are substantially different services from a user perspective, the wireless infrastructure is much the same.

In each of these technologies, even though they provide both Internet and PSTN connectivity, the Internet aspect is separated from the telephony aspect. Furthermore, none of these technologies enables one device to create an Internet communication with another device simply by dialing its telephone number.

In FIG. 1 there is shown a schematic illustration of a conventional Internet and telephony environment, including the Internet, a telephone central office with a switching system, and VoIP and DSL interface devices.

Referring to FIG. 1 of the drawings, Personal Computers (PCs) or similar devices 33, labeled "C" and "D" reside on a Local Area Network (LAN) 35 connected to the Internet 10 via an access line 28, commonly a T-1 type of circuit. Telephones 20 are connected to the telephone company (telco) switching system 14 by telephone lines 18. Switching system 14 has voice trunking 36 to other switching systems, along with SS7 messaging circuit 38 to convey conventional call setup and similar operational information between switching systems. Switching system 14 resides in a telco Central Office facility (C.O.) 12, which also houses a Voice over IP (VoIP) interface device 24 having a similar access line 28 and multiple telephone lines 18. Although the VoIP interface device, and other interface devices discussed herein typically are co-located in the telco central office, it could be located elsewhere with the appropriate interconnecting circuits trunked in via any of a number of types of multiplexed data circuits. Operationally, multiple, concurrent voice sessions are carried digitally over access connection 28 (multiplexed), and are demultiplexed or distributed to individual telephone lines 18 by the interface device 24. The hatched portion 26 of interface device 24 is a router function, which may be built into the interface device as shown, or may exist as a stand-alone device.

The purpose of the VoIP interface device is to allow Internet users such as C and D to make voice telephone calls. The Voice over IP carrier provides each of its users with a software application (not shown) that enables the computer user to enter a number to be dialed. By way of example, one of the computer users 33 labeled "C" dials the telephone number of a telephone 20 labeled "E" by using the VoIP software application. That software application, perhaps operating in conjunction with other systems of the VoIP carrier, creates a logical connection to a remote VoIP interface device such as 24 by sending a call setup request message to it over the Internet. The call setup request message contains the called telephone number (TN) as well as the calling device's IP address. The VoIP interface device 24 then takes a telephone line 18 "off hook", and dials the telephone number of telephone 20 labeled "E" on behalf of computer user C. Switching system 14, upon receiving the dialed digits, connects the telephone line 18 from the VoIP interface device to the telephone line 18 serving telephone C. The VoIP device then acts as a conduit for the resulting voice grade connection between the two devices. Switching system 14 is unaware that the call originated from a PC, and does not know the PC's IP address.

In a second example, computer user C dials the phone number of computer 33 labeled "A". As before, a call setup message is sent from A to the VoIP interface device, resulting this time in switching system 14 connecting the telephone line 18 from the VoIP interface device to the telephone line 18 serving telephone associated with computer A. There is no provision for this connection to connect to computer A, only to the analog phone associated with A. Moreover, in each of the preceding examples, no means is provided for the calling and called device to create an Internet communication between themselves when one of the devices is called by dialing a telephone number.

Next described is the DSL operation for the environment just described. With continued reference to FIG. 1 of the drawings, the Internet 10 is associated with the telephone central office as 12 containing the telephone switching system 14 through a DSL interface device 22 incorporating DSL modem circuit cards 40. Analog telephone lines 18 connect from the telephone switching system 14 to the DSL modems 40. The DSL interface device has an access line 28 to the Internet. Emanating from the DSL interface device 22 are telephone lines 30 carrying the composite signal of analog plus carrier wave to the client devices. The carrier wave portion of the telephone lines 30 terminates in DSL subscriber modems 29, which split off the analog phone line 18 terminating on a phone 20 separately from a high speed data connection 31 to the user computer 33. The high-speed data connection 31 is typically an Ethernet connection. DSL service as currently provisioned creates an Ethernet connection for the user computer and an analog voice connection for the user phone.

The purpose of the DSL interface device is to allow Internet users such as A and B high speed access to the Internet 10, while still allowing the respective telephones 20 of A and B to function as analog phones. By way of example, computer users 33 can access resources on the Internet 10 via the DSL interface device 22, the incorporated router function 26, and Internet access line 28. The users of A and B can use the respective telephones to dial telephone calls, which activity is passed transparently through the DSL interface device 22 to switching system 14, whereupon it is handled by the switching system as an ordinary telephone call. No means are provided for the calling and called devices to create an Internet communication between themselves when one of the devices is called by dialing a telephone number.

In the environment just described, switching system 14, VoIP interface device 24, DSL interface device 22, or any other similar interface devices, exist as separate, nonintegrated systems, and as such are not capable of exploiting the full advantages of integrating the Internet with the PSTN.

There presently exist designs of voice communications systems such as office PBX's (Private Branch Exchanges) which operate in "pure packet" mode. Prior designs of communications switching systems operate in "channelized" mode, in which resources are dedicated to a voice communication for the duration of a call, regardless of whether you are singing or holding your breath. In packet switching, resources are only consumed when there is actual (voice) data to transmit. Packet switching designs for data have been available for years, and in fact are central to the Internet; but the packet switching concept has not generally been applied to voice communications because the remaining entirety of the telecommunications world is channelized. New "pure packet" PBX designs, however, anticipate a change, especially in regard to transmitting voice traffic over the Internet. For years, most voice calls have originated as analog, and have been digitized at the telco central office, only to return to analog to be delivered to the destination phone. Pure packet PBX's also digitize the voice, but assemble groups of digitized elements and wrap those groups in an IP packet. The packets are then routed internally in the switch in the same manner that Internet routers function, with the advantage that the packet is compatible with all Internet devices, and hence the exact same packet can be sent out a data communications link across the Internet. However, even though there are advantages and promises to "pure packet" designs for switching systems, they have limited application to conventional Telco central office switching systems due to the channelized nature of the PSTN.

Accordingly, to further promote the integration of the Internet with the PSTN there remains a need in the art for a method and means to integrate the functions provided by these systems and devices, and to provide an environment for the effective implementation of pure packet telco switching systems.

SUMMARY OF THE INVENTION

Central to the principles and practice of this invention, as well as the inventions described by certain co-pending patent applications (described hereinafter), is a means for enabling a calling device to create an Internet communication with another device simply by dialing its telephone number, thus integrating the Internet with the PSTN. The co-pending patent applications describe various aspects of this integration. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein. The enhanced capabilities provided by the present invention facilitate that integration.

The present invention augments the co-pending applications by providing a method and means for integration of a telephone central office switching system with associated switching system interface devices to optimize the capabilities of these systems and devices when integrating the Internet with the PSTN. In particular, the integration of such systems incorporates a means and method of operation to engage in specific messaging communications to individual telephony and Internet devices. Such messaging facilitates end-to-end Internet communications by enabling a calling device to create an Internet communication with another device simply by dialing its telephone number, thus integrating the Internet with the PSTN. Specifically, the central office switching system, or an switching system integrated interface device, obtains the IP address of either the calling or called device, and provides that IP address to the other device via the messaging capability. If either of the calling or called devices is provided with the IP address of the other, it may initiate an Internet communication with the other device by sending an appropriate message addressed to the other device's IP address. The Internet Protocol incorporates the IP address of the sender and the receiver in every message. When one device initiates an Internet communication to the other, the receiver automatically learns the IP address of the sender and a two-way communication can commence.

There are a variety of ways to obtain the IP address of a calling or called device. In each such arrangement, there are provided telephone number cross-references, which contain the IP address associated with the telephone number of an Integrated Device. In simple terms, Internet devices or telephone devices wishing to communicate with an Integrated Device known by a telephone number can determine if that telephone number has an IP address associated with it by looking it up in a cross-reference, or by having an agent such as a telephone central office perform that lookup. Cross-references of IP addresses to telephone numbers could be maintained in the Internet, in the PSTN, in the device, or in any combination of the three.

Once an IP address has been obtained for a calling or called device it must be delivered to the other device. This invention also provides a means for delivering the IP address of one device to the other. In general terms, this comprises an addressable digital messaging arrangement such that digital messages can be sent to one or the other of the two devices. The Internet, of course, satisfies this requirement and is suitable in some arrangements. However, there also are other available technologies suitable for sending addressable digital messages in a telecommunications environment, such as the SS7 network and the messaging component of ISDN service (Integrated Services Digital Network). This aspect of the invention inherently requires that the sender know the digital address of the device to which the message will be sent. In some arrangements, that address will be an IP address, perhaps discovered from a cross-reference. In other arrangements, such as an ISDN environment, that address is automatically tied to the telephone number, so one device only needs to know the telephone number of the other to send it an ISDN message. In yet other arrangements, the telco switching system will know that address from subscriber records.

The messaging communications facility carries call management (e.g., call setup, call control), telephone number, and IP address messages to and from the switching system, switching system interface devices, and to and from the terminal (user) communications devices. A purpose of the messaging is to provide the calling or called device, or both, with information adequate to conduct a communication between themselves over the Internet when that communication was started by one device calling the telephone number of the other device on the PSTN.

There are several possible messaging systems that the PSTN might use to obtain an IP address and to notify the calling or called device of the remote device's IP address. The messaging communications as specified in this patent application utilizes one or more of these existing technologies. The messaging communications extends directly or indirectly to one or the other or both of the calling and called devices. The worldwide PSTN has the SS7 messaging system interconnecting all the major switching centers. It would be reasonable to anticipate that telephone companies might use SS7 for this purpose, for example, by forwarding an IP/phone number query to the serving agency of the called device via SS7, and receiving the query response and IP address by SS7. As other possibilities, the PSTN might use an existing messaging technology such as the digital messaging capability incorporated into the Integrated Services Digital Network (ISDN), or Analog Display Screen Interface (ADSI). As still another possibility, the PSTN might have Internet access in order to communicate via Internet messages with the calling or called device, switching system interface devices, or other central office switching systems. Further, the PSTN might use a mix of technologies, for example, SS7 might be used to transport call management and IP address messages from one C.O. to another, but ISDN or ADSI might be used to communicate the same information to the terminal (user) device. Since multiple workable arrangements are possible, we only need to specify that the PSTN has a method of sending appropriate messages to one or the other or both of the calling and called devices.

The ADSI messaging capability mentioned above is a simplistic messaging technology of modest success, which is an outgrowth of Caller-ID. ADSI is a superset of the Automatic Number Identification (ANI) protocol used by Caller-ID and Call Waiting-ID. The terminology ADSI is used generally herein to encompass ADSI, ANI, Caller-ID, and Call Waiting-ID. ADSI provides 1200 bit per second modem communications messaging between a telephone central office and an analog ADSI phone, or between two ADSI phones, one acting as a server. The messaging is interruptive, in that modem connections use the voice frequency band and so, at any moment, an analog telephone line can carry either a voice conversation or an ADSI modem connection, but not both. As an example, Call Waiting ID interrupts the called party's audio for a second or so while ADSI Call Waiting data (the calling phone number) is being received. The data rate is also very slow, and so has limited applications. Nevertheless, since Caller-ID, Call Waiting ID, and some other services have been implemented using ADSI, it would be advantageous for the PSTN messaging system to optionally have available a messaging system mode that is compatible with ADSI. The utility might be limited, but might be suitable for some purposes, products, price ranges, and the like.

Devices for integrating the Internet with the PSTN ("Integrated Devices"), as specified in the co-pending patent applications, have both an Internet connection with an associated IP address, and have a telephone connection with an associated telephone number. The telephone connection to the PSTN could be a virtual telephone line, such as that being provided over cable-TV systems. Additionally, Integrated Devices provide a cooperative messaging communications capability for communicating call setup and call control messages with the PSTN wherein the messages convey telephone number and IP address information.

As mentioned above, cross-references of IP addresses to telephone numbers could be maintained in the Internet, in the PSTN, in the terminal (user) device, or in any combination of the three. The Internet already maintains a cross-reference system, referred to as the Domain Name Service (DNS), which allows an Internet "site" or "location" to be publicly known by an alphanumeric name, such as Sears.com or Toyota.com, rather than by the strictly numerical IP address. (A master registry is maintained by the InterNIC organization, and is copied daily to thousands of DNS servers around the world.) This DNS service could be expanded to also maintain telephone numbers for these Internet locations. In addition, the cross-reference of IP addresses to telephone numbers could be indirect via the use of names by looking up a telephone number (TN) to find a name, then looking up the name to find the IP address. In the more straightforward version of this arrangement, if an Internet device wished to communicate via the Internet to a device known by a telephone number, it could query an appropriate DNS server for the telephone number. If the called device is listed in the DNS server as having an IP address, the calling device will receive that information back from the query. The calling device may then communicate with the called device via the Internet.

In another cross-reference version, the Integrated Devices themselves could provide the cross-reference of telephone number to IP address by a device knowing its own TN and IP numbers. The calling and called devices could exchange this information using available techniques such as the messaging system incorporated into ISDN.

The PSTN could also maintain a cross-reference of telephone numbers having associated IP addresses. Thus, if a device, having an IP address, called a second device, also having an IP address, and the PSTN maintained a cross-reference of these numbers, then the PSTN could notify the caller of the called device's IP address via a digital messaging arrangement (or optionally, notify the called device of the caller's IP address). The caller could then communicate directly with the called device via the Internet. In the discussions of the PSTN, it should be understood that the PSTN is no more a monolithic whole than is the Internet. It is comprised of very many telephone companies and authorities, and each might have very many switching centers (telephone company Central Offices). Therefore, in an arrangement in which "the PSTN" maintains a cross-reference between phone numbers and IP addresses, an authority, company, regional district, or Central Office maintains such a cross-reference for local subscribers, and depends on other authorities, companies, regional districts, or Central Offices to maintain the same information for their own local subscribers. Further, a cross-reference is associated with a central office switching system, or associated with a switching system interface device, or other element of a switching center.

There are five primary arrangements involved in the establishment of an integrated Internet/PSTN call. In the first arrangement, the telephone central office switching system receives a digital call setup message, which includes the calling device's IP address (the other scenarios presume that the call setup message does not include the calling device's IP address). The call setup message could be received by the switching system directly from the calling device, from a switching system interface device (VoIP, DSL, cable-TV, and the like) that provides Internet and telephony services to its client devices, or, via the SS7 messaging system, from another telephone central office switching system where the call originates. In its most simple implementation, the switching system forwards the digital call setup message, or the essential elements of such a message, to the called device using an available messaging communications medium, such as ISDN, SS7, or one yet to be defined. That message is sent directly to the called device if it is directly connected to the switching system, via a switching system interface device (again, VoIP, DSL, and the like) if the device is a client of such an interface system, or, if the called device is served from another switching system, sent via SS7 to the terminating central office switching system which provides telephone service for the called device. For messages to be sent via a switching system interface device (VoIP, DSL, and the like), the interface device must subscribe to the arrangement described in the co-pending patent application "Telephone Central Office Switch Interface With Messaging Channel For Integrating The PSTN With The Internet", Ser. No. 60/301,758.

The called device, upon receiving such a call setup message, may accept or reject the requested Internet connection (perhaps its connection to the Internet is temporarily out of service) by sending a return message to the central office switching system. If it chooses to accept the request, since now it has the IP address of the caller, the called device simply sends a call acceptance message via the Internet directly to the calling device, and an Internet communication will then commence. That acceptance message could also be sent in the reverse path via the switching system to the calling device, the particular path that the acceptance message traverses being unimportant to the central concepts. And then, via either Internet or switching system messaging, the two devices may mutually decide whether to conduct all communications over the Internet and abandon the PSTN portion, or to conduct any portion of the communications over the Internet and any portion over the PSTN. Obviously, then, either or both devices would send appropriate messages to the switching system to ensure it properly handled the PSTN portion of the call: i.e., set up a PSTN connection, or don't set up a PSTN connection.

In a more elegant variation of this process, the switching system determines whether or not the called device is an Integrated Device by referring to a records system which maintains subscriber service information including the TN, Integrated Device status, and perhaps other information such as the device's associated IP address and any other identifier for the device as used by the switching system. If the called device is not an Integrated Device the switching system responds to the call setup message by rejecting the request for an Internet connection, and continues by setting up a conventional analog connection to the called device. In practical implementations one might expect more robust protocols than those just described, specifying exactly how messages and requests are acknowledged, accepted, rejected, and the like, (e.g., what happens if a message is not acknowledged, is there a time-out and retry, or the like), but those details are not relevant to the concepts being presented herein, and one skilled in the art should be able to craft a suitable protocol suite for this purpose by modeling after similar protocol suites.

Variations on the above process are also possible. For example, the central office switching system might obtain the IP address of the called device and deliver that address to the calling device, permitting the calling device to initiate the Internet communications. Additionally, the PSTN might obtain the IP addresses of both the calling and called devices, and provide each device with the IP address of the other.

In the remaining arrangements to be described, it is presumed that the call setup request does not provide the IP address of the calling device. There are four of these arrangements: in one arrangement, the central office switching system retrieves the IP address from subscriber records that it maintains; in another arrangement, the central office switching system retrieves the IP address from either or both of the calling or called devices themselves; in another arrangement, the central office switching system retrieves the IP address from the interface device which provides Internet and telephony services for the calling or called device; in the last arrangement, the central office switching system retrieves the IP address from an Internet source. In all the arrangements, the fundamental process is the same: the telephone central office switching system obtains the IP address for at least one of the calling and called devices, and delivers that IP address to the other of the calling and called devices via a digital messaging system. These arrangements will be described hereinafter in greater detail.

In any of the above arrangements, the resulting "communication" between the devices could be entirely over the Internet (voice, screens, images, and the like), or part of the communication could transpire over the Internet (the screens and images, for example), and part could transpire over the PSTN (the voice communication, for example). An arrangement in which the voice communication is carried over the PSTN solves a longstanding VoIP problem—that of poor audio quality. Internet telephony arrangements have no direct way to control the path that voice message packets (or any packets) take as they traverse the Internet. The number of router hops is unpredictable, even from one packet to the next, and packets can be routed over heavily trafficked and congested links, causing lengthy delays. In addition, the congestion control mechanism utilized by Internet routers is to simply discard packets since the higher-level protocols (such as TCP and UDP) are designed to resend missing packets.

The net result, due to routing ambiguities, congestion, out of sequence packets and dropped packets, is that the delivery of Internet data has a high degree of variability from a timing perspective. In general this is not of significance in the delivery of visual information, web pages for example; we can wait for a web page to be constructed on the screen, and it doesn't matter if various parts are randomly constructed before other parts. Audio data, however, is significantly affected, and one of the biggest detractions to Internet telephony is poor quality audio. Since the receiving device must deliver the audio stream to the listener with rather precise timing, missing, out of order, or delayed audio data packets cannot be included in that audio stream. Consequently, the delivered audio stream can have voids of uncontrollable lengths, along with a variety of other undesirable audible artifacts that collectively constitute bad sound quality.

On the other hand, the PSTN provides a dedicated (channelized) connection for each telephone call, which avoids all the problems characteristic of the Internet. Consequently, then, an arrangement is provided for in this application in which visual information traverses the Internet and audio information traverses the PSTN, thus providing the best features of each network to the resulting communications.

Certain enhancements over the co-pending patent applications are herein described. These enhancements offer further advantages to the integration of the Internet with the PSTN. The present invention augments the co-pending applications by providing a method and means for integration of a telephone central office switching system with associated switching system interface devices to optimize the capabilities of these systems and devices when integrating the Internet with the PSTN.

There are a variety of telco switching system interface devices including VoIP, DSL, cable-TV, fixed wireless, and Internet capable cellular wireless, and similar distribution systems, which provide Internet and telephony services to client devices, such as phones and PCs, including Integrated Devices, by providing an interface to the telephone company central office switching system for their client devices. Each of these interface devices may co-reside in a telco central office, and each may incorporate any or all of a messaging communications function, a router function, a records function, and multiple analog telephone line connections.

In the first form of the present invention any number or type of these devices are integrated into a common interface device system having shared resources as suggested previously. These shared resources include: a shared messaging function, a shared router function, a shared records function, and a shared high-speed multiplexed voice communications channel. Some of these shared functions may be implemented in the form of a wired backplane in a chassis or cabinet such that they are universally available for plug-in modules or circuit cards. The integrated interface device system just described has common interconnections to the associated switching system for the messaging communications link and the high-speed multiplexed voice communications channel, thus minimizing the number of physical connections required between the integrated interface device system and the switching system.

The simplicity and apparent economies of an integrated interface device system are readily apparent. An additional benefit is realized because the common messaging and common router functions enable Internet data traffic between Integrated Devices served by the integrated interface devices to be routed within the system via the common router function, rather than being routed out to the Internet from one interface device and then back from the Internet to another interface device. In other environments, this arrangement is referred to as "edge routing", wherein local Internet traffic is directed by local "edge" routers from source to destination. Since the edge router is part of the Internet and since the data being routed is Internet Protocol data, edge routed traffic is considered part of the Internet even though that traffic may not penetrate very far into the Internet.

As an extension of the edge routing concept, another aspect of this invention comprises the interconnection of the router function between integrated interface device systems in separate telco central offices. Since the majority of telco voice traffic is local in nature—people calling other people, stores, and so on in their community, the majority of integrated Internet/telephony traffic is also likely to be local in nature, in that the invention of integrating the Internet and the PSTN will enable the same communications to take place but in a richer, multimedia fashion. In this respect, the interconnection of edge routing systems will enable the majority of Internet traffic to actually not penetrate into the Internet at all, but to be routed entirely at the edge by telco central office systems, thus giving rise to "private" Internets carrying the bulk of Internet traffic. The operators of such "private" Internets have the opportunity to provide the communications equipment and resources to guarantee performance levels for their clients and subscribers.

In another form of the present invention, the switching system itself is integrated into a common assembly with the integrated interface devices, whereupon there is further consolidation, and greater benefits of integration are achieved. In this arrangement, there no longer is a need for interconnections between the integrated interface device system and the switching system for a messaging communications link and a high-speed multiplexed voice communications channel, since the switching system now shares those facilities via the same sharing mechanism as used by the integrated interface device system. In particular, these additional functions may be implemented as connections from elements of the switching system to a common wired backplane in a chassis or cabinet, whereupon they are immediately available to any other device or system connecting to the common wired backplane.

In yet another aspect of the present invention, the switching system operates in a packet mode internally, versus today's conventional "channelized" design. In this mode, all voice and all data, and all digital messages can take the same digital packet form, and can travel across common links. An arrangement of this invention mentioned previously provides for interconnecting integrated interface device systems between central offices to edge route locally generated traffic. Such an arrangement accords an opportunity to implement a pure packet switching system to great advantage. In pure packet switching system arrangements, there is a need for only one channel or link between switching systems instead of a voice trunking, an SS7 messaging, and an Internet Edge Routing circuit. All traffic, including voice traffic that originates from analog phones, can traverse the same communications circuit, thus generating even further economies and presenting opportunities for still other future enhancements.

This invention, then, provides for an efficient telco central office design that consolidates a variety of systems and devices into a single system, and this, in turn, enables the deployment of edge routed local Internets, and the deployment of a single communications system for the transmission of all data, whether Internet, voice, or central office signaling. The integrated systems provide a messaging communications facility between components of the integrated systems and between these systems, other elements of the PSTN, and Integrated Devices to convey messages carrying call management and IP address information. Advantageously, the present invention provides a method and means for an integrated telephone central office switching system to facilitate the integration of the Internet and the PSTN so that a calling device can achieve an Internet communication with a called device by dialing the telephone number of the called device.

BRIEF DESCRIPTION OF THE DRAWINGS

The invention will be more fully understood when reference is had to the following detailed description of the preferred embodiment of the invention and the accompanying drawings, in which.

DETAILED DESCRIPTION OF THE INVENTION

Figure 1:
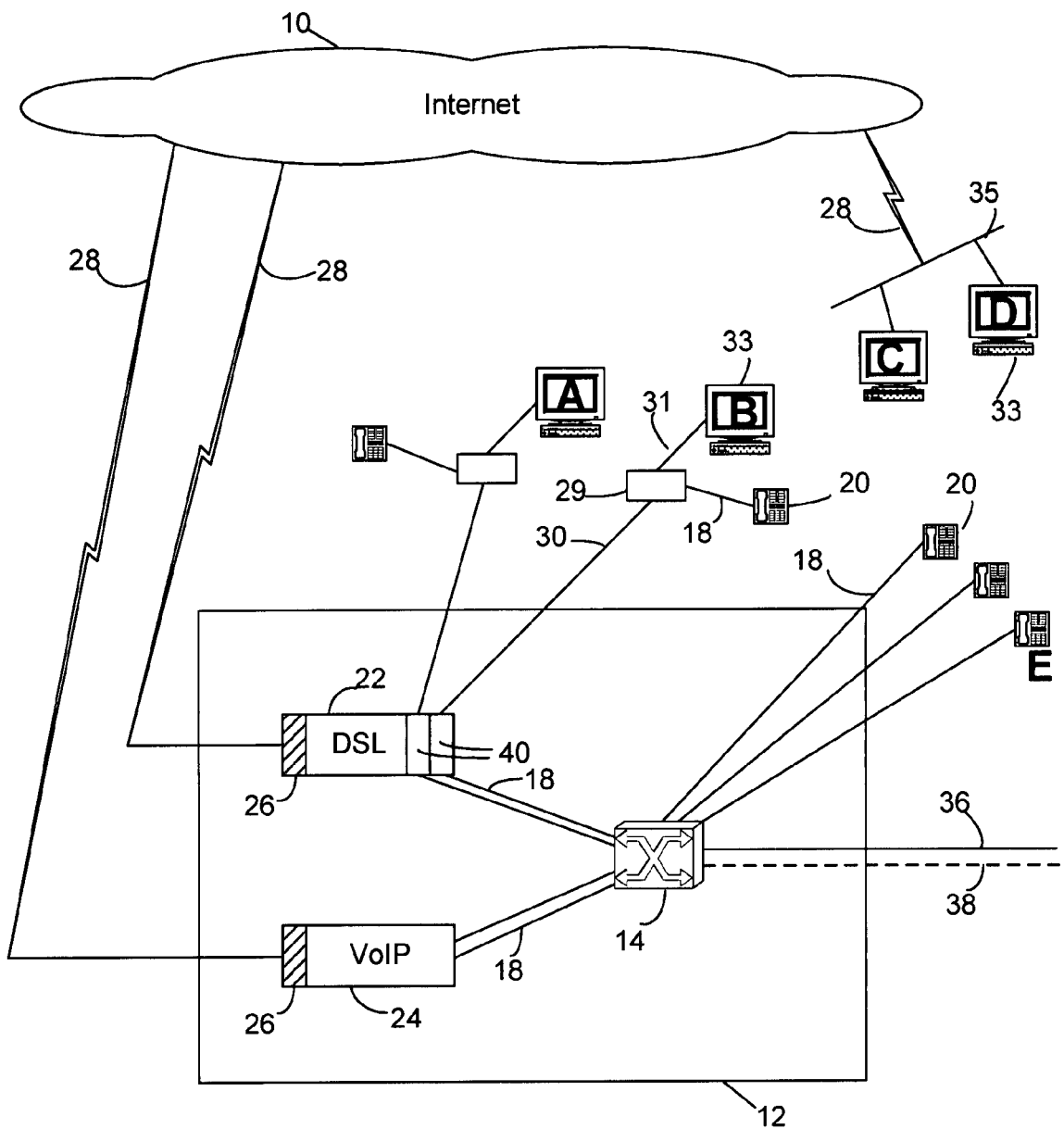
FIG. 1 is a schematic illustration of a conventional system, showing a telco central office with DSL and VoIP interface devices connected to the Internet.

This invention provides a telephone central office switching system having unique features and methods of operation that enable the integration of the Internet with the PSTN; more specifically, it enables a calling device to establish an Internet communication with a called device simply by dialing its telephone number. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein.

Co-pending patent applications describe various aspects of this integration; the enhanced capabilities provided by the present invention facilitate that integration. The following provides an overview of the co-pending patent applications and patents; these documents are hereby incorporated by specific reference thereto.

Co-pending patent application entitled "Integrated Device For Integrating The Internet With The Public Switched Telephone Network", application Ser. No. 10/176,466 (now issued as U.S. Pat. No. 6,704,305), describes "Integrated Devices", for integrating the Internet with the PSTN, which have an Internet connection with an associated IP address, a PSTN connection with an associated telephone number, and a digital messaging connection to the PSTN for conveying call management messages to include messages containing telephone numbers and IP addresses.

Co-pending application entitled "Integrating the Internet with the Public Switched Telephone Network", U.S. patent application Ser. No. 10/176,476 (now issued as U.S. Pat. No. 6,700,884), describes an enhanced communications environment in which a telephone call placed to an Integrated Device creates end-to-end communications over the Internet rather than over the PSTN. The present invention augments the system disclosed by this application by providing a method and means for enabling a telephone central office switching system to engage in specific messaging communications to individual telephony and Internet devices. Such messaging facilitates end-to-end Internet communications.

There exists a class of devices, such as those for Voice over IP, DSL, cable TV, fixed wireless, Internet capable wireless cellular, and similar distribution systems, which provide Internet and telephony services to client devices, such as phones and PCs, by providing an interface to the telephone company central office switching system. Co-pending application entitled "Telephone Central Office Switch Interface With Messaging Channel For Integrating The PSTN With The Internet", U.S. patent application Ser. No. 10/177,792, discloses a method and means for providing specific messaging capabilities between a telephone central office switching system and this class of interface device, enabling the integration of the Internet with the PSTN. The communications link carries call setup, telephone number, and IP address messages to and from the switching system and to and from the client devices of the interface device.

Co-pending patent application entitled "Telephone Switching System For Integrating The Internet With The Public Switched Telephone Network", U.S. patent application Ser. No. 10/195,227, discloses a method and means for a telephone central office switching system to enable a calling device to establish an Internet communication with a called device by dialing its telephone number.

A messaging system such as that specified in the co-pending patent application entitled "Call Management Messaging System For Integrating The Internet With The Public Switched Telephone Network", U.S. patent application Ser. No. 10/195,241 (now issued as U.S. Pat. No. 6,697,357), exchanges call management messages such as call setup requests, call disconnect messages, Call Forwarding messages, and so on, between communications systems and user devices, either being connected to the Internet, the PSTN, or to both.

Co-pending patent application entitled "Interactive Device Control System For Integrating The Internet With The Public Switched Telephone Network", U.S. patent application Ser. No. 10/228,748, discloses a system for the PSTN and the Internet in which a communications system offers the user of a device such as a screen phone the ability to control or influence functions of the communications system by presenting the user with a displayed menu of options. The menu of options is sent to the user's device by the communications system via a messaging system. Selection of an option by the user returns a response message to the communications system via the messaging system. Upon receipt of the response message, the communications system actuates the function associated with the user-selected option. The interactive device control system operates seamlessly across both the Internet and the PSTN, thus providing further integration of those two networks.

Co-pending patent application entitled "Stored Profile System For Storing And Exchanging User And System Communications Profiles To Integrate The Internet With The Public Switched Telephone Network", U.S. patent application Ser. No. 10/228,723 (now abandoned) discloses a system for the PSTN and the Internet to maintain and exchange communications related information such as hardware capabilities and personal information and preferences. The Stored Profile System enables devices to synchronize and optimize their communications capabilities, and enables users to exchange contact information such as Electronic Business Cards as a part of call setup, operating like an enhanced Caller-ID. The stored profiles capability extends to communications systems on both the PSTN and the Internet, thus further promoting the integration of the Internet with the PSTN.

Central to the principles and practice of this invention, as well as the inventions described by the co-pending patent applications, is the presence of means for enabling a calling device to create an Internet communication with another device simply by dialing its telephone number, thus integrating the Internet with the PSTN. The co-pending applications describe an environment in which the various elements of the PSTN are enabled to conduct digital, packetized messages, which communicate essential information between various devices across the Internet and the PSTN to provide for this integration. Although not limited to the scope of the following listing, these enabled PSTN elements include: (i) the end or terminal devices such as telephones and Integrated Devices; (ii) telephone central switching system interface devices, such as those for VoIP, DSL, cable-TV, fixed wireless and Internet enabled cellular wireless, and the like, which provide telephony and Internet services for client devices; (iii) telephone central office switching systems which provide telephony services for client devices; (iv) telephone long distance switching systems which provide long distance capabilities on the PSTN; (v) office telephone systems such as PBXs, Key Systems and the like; and, (vi) adjunct devices such as automated attendant systems, automatic call distributors, voice mail systems, and the like.

Some of these devices, including the end or terminal devices, are uniquely addressable within the messaging system via an IP address, telephone number, or other identifier associated with the device. Other identifiers could include an internal system reference (e.g., module, cabinet, shelf, slot, port number), an ISDN (Integrated Services Digital Network) address, or the like. Regardless of the nature of the address, Integrated Devices have messaging addresses known to the serving system such as a telephone central office switching system, telephone central office switching system interface device, office telephone system, and the like, such that the serving system can communicate with the Integrated Devices via the messaging system.

The messaging system common to this invention and the inventions of the co-pending patent applications connects between each of these devices and systems, and the messages of which the messaging system is comprised are transmitted to and between each of these devices as are necessary for any individual communication. Some devices and systems may simply act as a pass-through for the message stream by passively or actively forwarding messages, or may act as a pass-through for specific message types while acting upon others. Each device or system may send, receive, forward, or act upon any given message as is necessary to accomplish the message functions. Messages may be sent in one or more pieces from one device to the next, and devices may assemble, reformat, re-packetize, augment a message with additional data, or otherwise manipulate a message as it is processed through the system.

The co-pending applications described hereinabove provide reference information useful in developing a full understanding of the present invention as it relates to these systems and devices. Accordingly, the disclosure of each aforementioned co-pending application is incorporated herein by specific reference thereto.

Certain enhancements over the co-pending patent applications are herein described.

Figure 2:
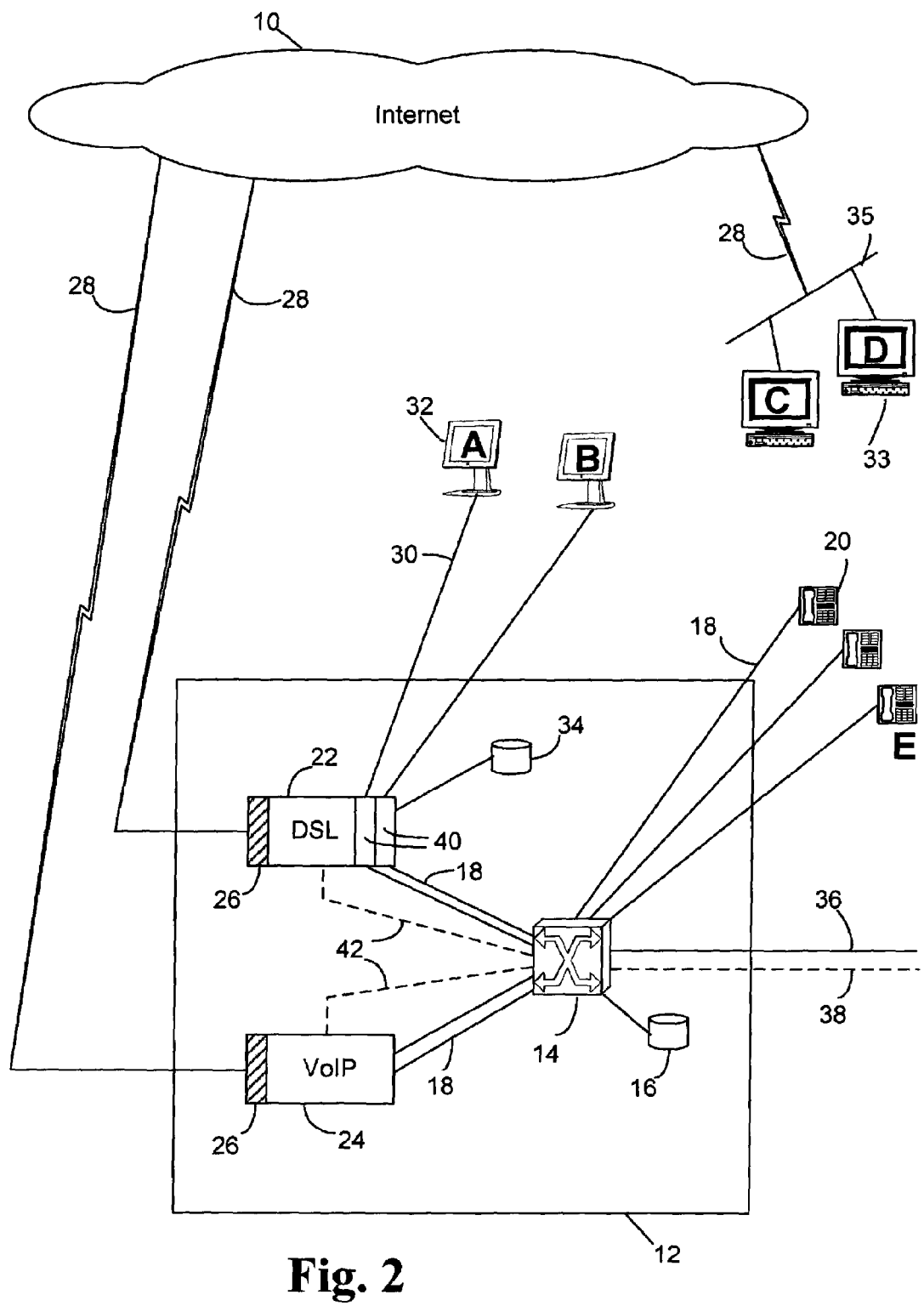
FIG. 2 is a schematic illustration illustrating the system of FIG. 1 modified for the inventions described in the co-pending patent applications.

In FIG. 2 of the drawings there is shown the environment of FIG. 1 recreated with changes according to the enhancements of the co-pending patent applications. Personal Computers A and B depicted as Integrated Devices 32 comprising client devices of DSL interface device 22. As Integrated Devices, they are shown without an external DSL modem and telephone, presuming that the DSL modem capability is provided internally, and that the Integrated Device provides full telephony functionality. Integrated Devices 32 are connected to interface device 22 via carrier wave telephone line 30. DSL Interface device 22 maintains a records system 34, comprising a cross-reference of telephone numbers to IP addresses for its client Integrated Devices. Switching system 14 maintains a records system 16, comprising a cross-reference of telephone numbers to IP addresses for Integrated Devices served by the switching system. Switching system 14 also has messaging communications links 42 to DSL interface device 22 and VoIP interface device 24 for conveying call setup messages to and from those devices, and to and from their client Integrated Devices, wherein the call setup messages contain telephone numbers and IP addresses, as specified by the co-pending patent applications. As in FIG. 1, Switching system 14 has voice trunking 36 to other switching systems, along with SS7 messaging circuit 38 to convey conventional call setup and similar operational information between switching systems; messaging circuit 38 is now enabled to convey call setup and other call management messages containing telephone numbers and IP addresses between switching systems.

Operationally, the arrangement in this drawing is fully capable of integrating the Internet with the PSTN at a basic level according to the co-pending patent applications: namely, that a device or Integrated Device can create an Internet communication with an Integrated Device simply by dialing its phone number. The following example illustrates this point. Still referring to FIG. 2, let PC 33 labeled "C" dial the telephone number of Integrated Device 32 labeled "A" by entering A's TN into its VoIP software application. That software application sends a digital call setup request message over the Internet to VoIP interface device 24. The digital call setup request message includes the called TN and the IP address of the calling device. Upon receiving the call setup message, VoIP 24 forwards it to switching system 14 via messaging communications link 42. Switching system 14 upon receiving the call setup request message, forwards it to DSL interface device 22 via messaging communications link 42. DSL interface device 22 refers to its records system 34 to determine the physical location of the device associated with the dialed phone number within its hardware assembly, and forwards the call setup request message on to the called Integrated Device A across carrier wave telephone link 30. Integrated Device A, now having the call setup request message and the IP address of the caller can directly respond to the call setup request by sending an appropriate message across the Internet to the calling device C 33. It will be understood that the operational scenario previously described could have been presented in multiple fashions, depending, for example, upon what information was maintained in switching system 14's records system 16. So, this is just one workable scenario that fully implements the inventive matter of the co-pending patent applications.

Figure 3:
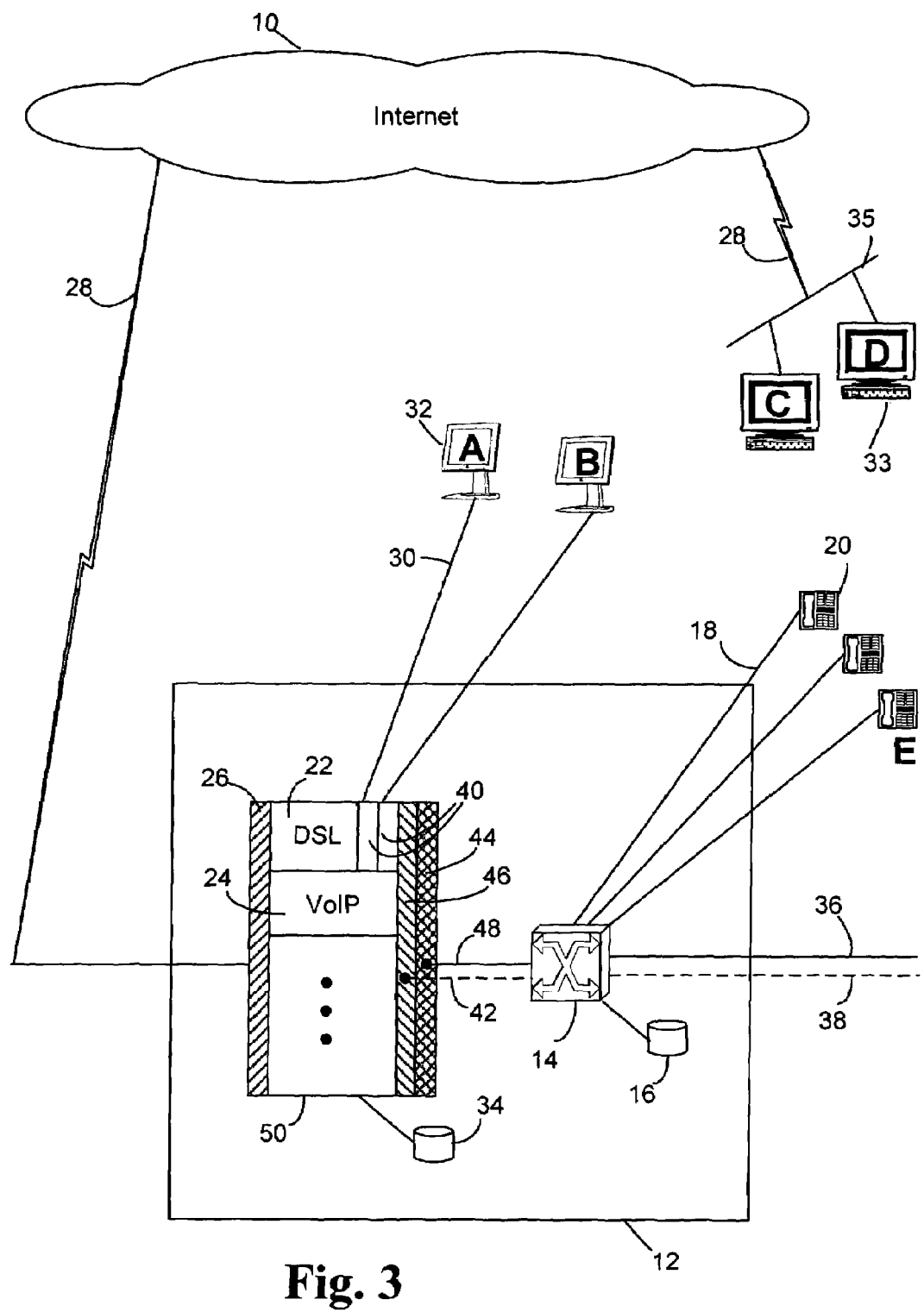
FIG. 3 is a schematic illustration similar to FIG. 2, showing the integration of the DSL and VoIP interface devices into an integrated interface device system.

FIG. 3 illustrates the first level of integration of these systems. DSL interface device 22 and VoIP interface device 24 now reside in an equipment assembly or system 50 such as an equipment rack or racks, a cabinet or cabinets, or such. Router function 26 is now common to all elements in that system, and one of the access links 28 to the Internet is eliminated in that only one link is needed no matter how many interface devices are integrated into the system. Router function 26 transports IP packetized data between the Internet and integrated interface devices such as DSL interface device 22 and VoIP interface device 24. In addition, router function 26 transports data within or between interface devices. For example, the routing of IP data to be sent from A to B will be effected by router function 26, as would the routing of IP data to be sent from A to C if C were a client of VoIP interface device 24. There is a common messaging channel 46 replacing the individual messaging links 42 that had connected to the individual interface devices. Messaging link 42 now connects from the switching system to the common messaging channel 46. There is a voice distribution channel 44 for delivering voice communications among the individual elements of the integrated system and to the switching system 14 via multiplexed voice communications channel 48. In FIG. 2, DSL interface device had a records system 34, as other interface devices might have had. The records system 34 is now a common function related to the system 50 and serves all the interface devices integrated into the system. The ellipsis dots in system 50 indicate that other switching system interface devices may also be incorporated as desired.

In operation, if, as in a previous example, PC user C called Integrated Device A by entering A's TN into its VoIP software application, the following process would apply. The software application sends a digital call setup request message over the Internet to VoIP interface device 24, passing through the common router function 26 which directs the call setup request message to the VoIP interface device itself. The digital call setup request message includes the called TN and the IP address of the calling device. Upon receiving the call setup message, VoIP 24 forwards it to switching system 14 via common messaging channel 46 and then across messaging communications link 42. Switching system 14, upon receiving the call setup message, examines its records system 16 and determines that the called device is served by the DSL interface device 22. Switching system 14 then forwards the call setup request message, or an equivalent message, to DSL interface device 22 via messaging communications link 42 and common messaging channel 46. DSL interface device 22 refers to the integrated interface system records system 34 to determine the physical location of the device associated with the dialed phone number within its hardware assembly, and forwards the call setup request message on to the called Integrated Device A across carrier wave telephone link 30. Integrated Device A, now having the call setup message and the IP address of the caller can directly respond to the call setup request by sending an appropriate message across the Internet to the calling device C 33. The Internet data from A would travel across carrier wave telephone link 30 to the DSL interface device 22, which directs it to router function 26, which in turn directs the data to the Internet via common access line 28. Consequently, an Internet communication is enabled between devices C and A which was initiated by C dialing the phone number of A.

For another example of the operation of this arrangement, assume that computer C calls telephone E by entering E's TN into its VoIP software application, the following process would apply. The software application sends a digital call setup request message over the Internet to VoIP interface device 24, passing through the common router function 26 which directs the call setup request message to the VoIP interface device itself. The digital call setup request message includes the called TN and the IP address of the calling device. Upon receiving the call setup request message, VoIP 24 forwards it to switching system 14 via common messaging channel 46 and then across messaging communications link 42. Switching system 14 upon receiving the call setup request message, examines its records system 16 and determines that the called device is a telephone served directly by the switching system itself. Since the terminating device is an analog phone, and not an Integrated Device, switching system 14 handles the call as an analog phone call by sending a return message to VoIP device 24 assigning it a connection across common voice channel 44 for this call, the connection also extending across voice communications link 48 between the integrated interface device system 50 and the switching system 14. Switching system 14 connects to and rings telephone E. Upon answering, switching system 14 completes the connection between E and the assigned connection on common voice channel 44, whereupon the calling and called parties can communicate.

As a third example, assume that there is a mirror image configuration of C.O. 12 and the associated systems and devices elsewhere in the PSTN (mirror image systems not shown). Assume that Integrated Device A is called by its mirror image Integrated Device A' (A prime) at the remote C.O. A digital call setup request message would be sent from A' through its DSL interface device and switching system, and then across messaging circuit 38 to switching system 14. Switching system 14 upon referencing records system 16, determines that the called TN is served by DSL interface device 22, and so forwards the call setup request message (or an equivalent) across messaging link 42 and common messaging channel 46 to DSL interface device 22. DSL interface device 22 then in referring to its records system, determines the physical location of the called device and forwards the call setup request message to A.

Assume that in this particular method of operation, the call setup request message contained the IP address of calling device A'. Integrated Device A may then send an appropriate Internet message addressed to the IP address of A', thereby initiating an Internet communication between the calling and called devices. That message would travel across the carrier wave link 30 from A to its DSL interface device 22, across common router function 26, and Internet access link 28, and then across the Internet to A'. Return messages from A' would follow the reverse path to arrive at A. In other methods of operation, the IP address of the called device A could be obtained from A itself, from the DSL interface device serving A, or from the C.O. switching system serving that DSL interface device, and then provided via the PSTN messaging system to the calling device A', or the interface devices and switching systems could provide both the calling and called devices with the IP address of the other. In all of these examples, an Internet communication ensues as a result of one device dialing the phone number of another on the PSTN.

A modification to the resulting Internet communication is provided for in which portions of the resulting communication traverse the Internet and portions traverse the PSTN. Since the PSTN is well suited to carrying voice traffic and the Internet is not, it may be advantageous to bifurcate the resulting communication by having images, graphics, and other visual information traverse the Internet, and the voice portion of the communication traverse the PSTN. In this arrangement, the Internet portion of the communication between A and A' would ensue as described previously. The voice communication would travel from A, across carrier wave link 30 to DSL interface device 22, from there to common voice distribution channel 44 and across multiplexed voice communications channel 48 to switch 14. Switch 14 would then route the referenced voice communications via multiplexed voice trunking 36 across PSTN to the remote systems and ultimately to A'. The terminal devices A and A' are provided with appropriate software to manage the bifurcated communications streams.

Another method of operation can be illustrated by extending the previous example. In this method of operation, the various elements of the PSTN under discussion act as a conduit for call management and IP address messages sent directly between the calling and called devices. For example, assume as in the previous example that both A and A' are clients of a DSL interface device, but now assume that these are both ISDN devices and communicate with their respective interface devices and switching systems using the ISDN protocol. Assume again that A' calls A, with the consequence of a call setup request message being sent across the PSTN from A' to A, much as in the previous example. Being ISDN devices, A and A' may send messages directly to each other across the PSTN messaging system in association with the establishment of a call. In this method of operation, the Integrated Devices A and A' send messages containing call management and IP address information to each other across the PSTN. The integrated central office systems which are the subject of this application provide the capability for such direct communication of messages conveying call management and IP address information between terminal (user) devices. To continue the example, device A receives a call setup request message from A', and responds by sending an ISDN-formatted message containing its IP address to A'. A' may then initiate an Internet communication with A, as a result of dialing the TN of A on the PSTN.

Figure 4:
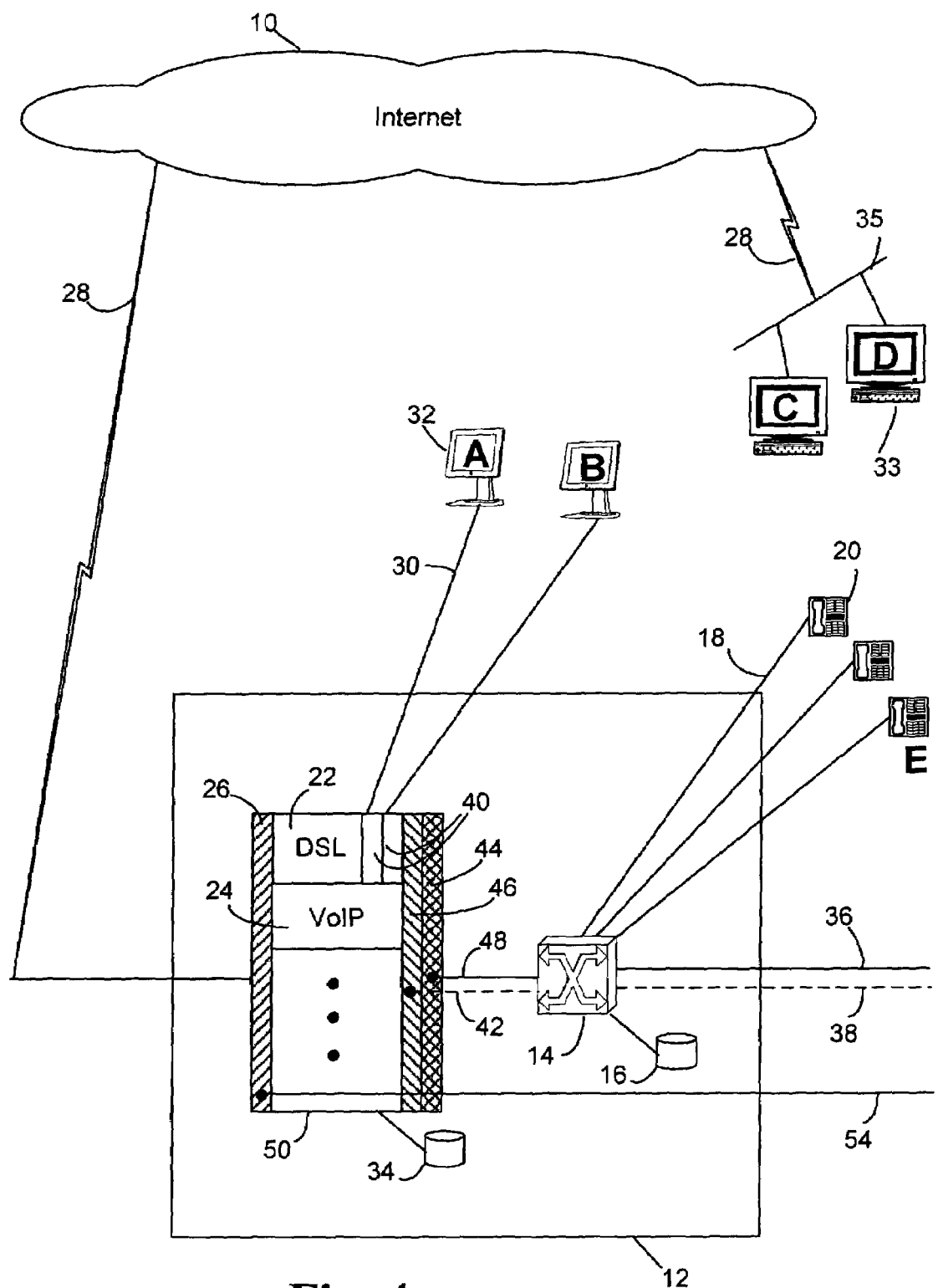
FIG. 4 is a schematic illustration of the system shown in FIG. 3, depicting a connection from the router function of the integrated interface device system to similar systems in other telco central offices.

The next level of integration is achieved by the system of FIG. 4, which depicts the elements shown by FIG. 3 with the addition of edge router communications link 54 connecting integrated interface system 50 to similar systems in other telco central offices. As an example of the operation of this arrangement, if Integrated Devices A or B were to create an Internet communication to a similar device in another telco central office, all the data traveling between those two devices, including digitized voice, images, video, and text, would be routed as IP data by their respective router functions 26 across edge router communications link 54, without actually penetrating further into the Internet than the respective edge router functions 26.

Figure 5:
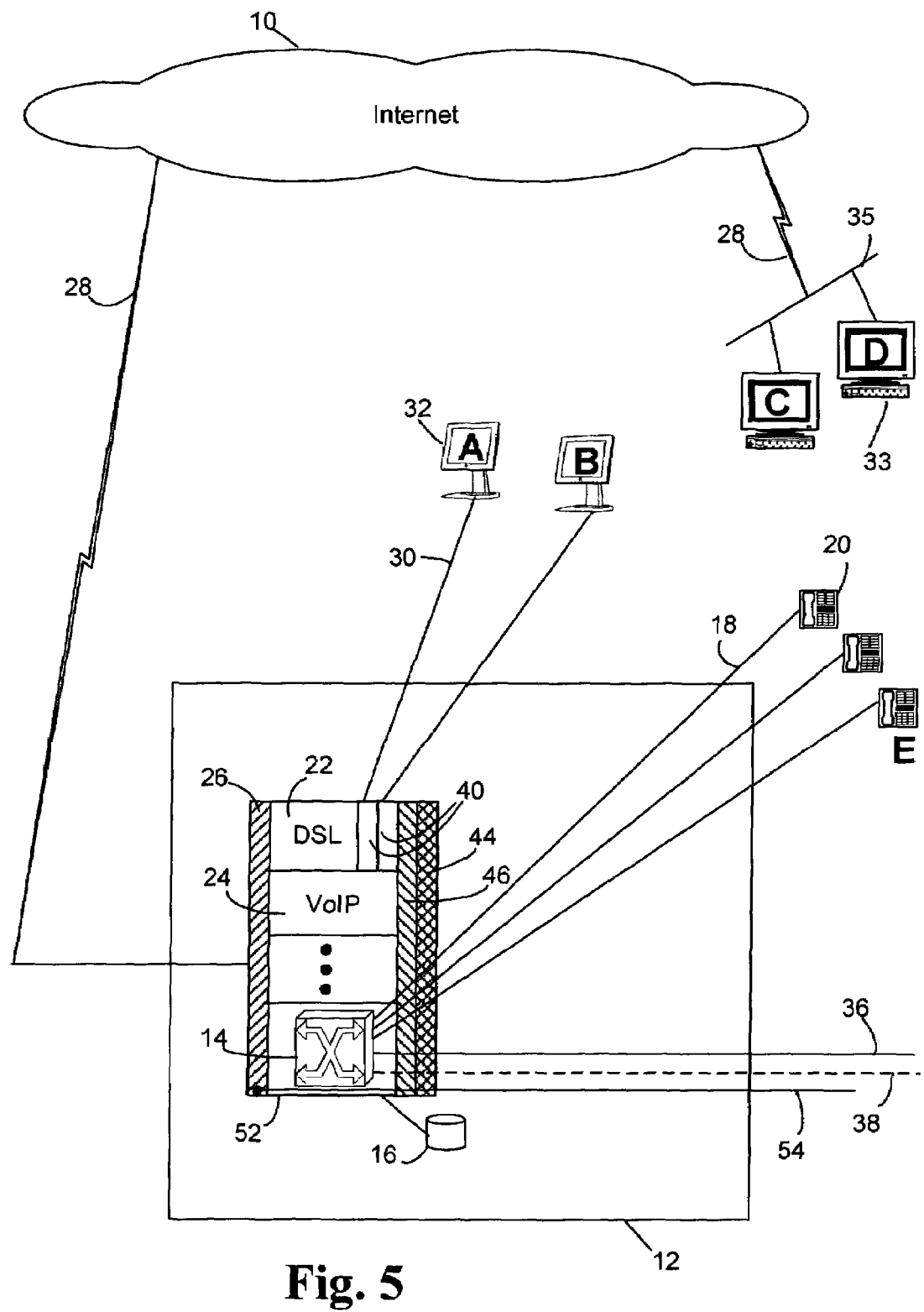
FIG. 5 is a schematic diagram illustrating the system of FIG. 4, enhanced by integrating the telco central office switching system into a common apparatus with the integrated interface device system.

FIG. 5 depicts a system having essentially the same elements as the system of FIG. 4, but in which the switching system 14 is also combined into an integrated central office system 52 such as an equipment rack or racks, a cabinet or cabinets, or the like. Integrated central office system 52 has a single records system 16 serving each of the systems and devices in the central office system 52. There no longer is a need for messaging communications link 42, nor for multiplexed voice communications channel 48, in that the switching system and all other systems and devices are directly connected to the shared messaging channel 46 and voice communications channel 44. Switching system 14 optionally maintains interconnection to other central office switching systems via multiplexed voice trunking 36 and messaging communications circuit 38.

Again using the same example as before, if PC user C called Integrated Device A by entering A's TN into its VoIP software application, the following process would apply. The software application sends a call setup digital message over the Internet to VoIP interface device 24. The digital call setup message includes the called TN and the IP address of the calling device. Upon receiving the call setup message via common router function 26, VoIP 24 forwards the call setup message to switching system 14 via common messaging channel 46. Switching system 14 upon receiving the call setup message, examines records system 16 and determines that the called device is served by the DSL interface device 22 and then forwards the call setup message to DSL interface device 22 via common messaging channel 46. DSL interface device 22 refers to the integrated records system 16 to determine the physical location of the dialed phone number within its hardware assembly, and forwards the call setup message on to the called Integrated Device A across carrier wave telephone link 30. Integrated Device A, now having the call setup message and the IP address of the caller can directly respond to the call setup request by sending an appropriate message across the Internet to the calling device C 33. The Internet data from A would travel across carrier wave telephone link 30 to the DSL interface device 22, which directs it to router function 26, which in turn directs the data to the Internet via common access line 28.

Figure 6:
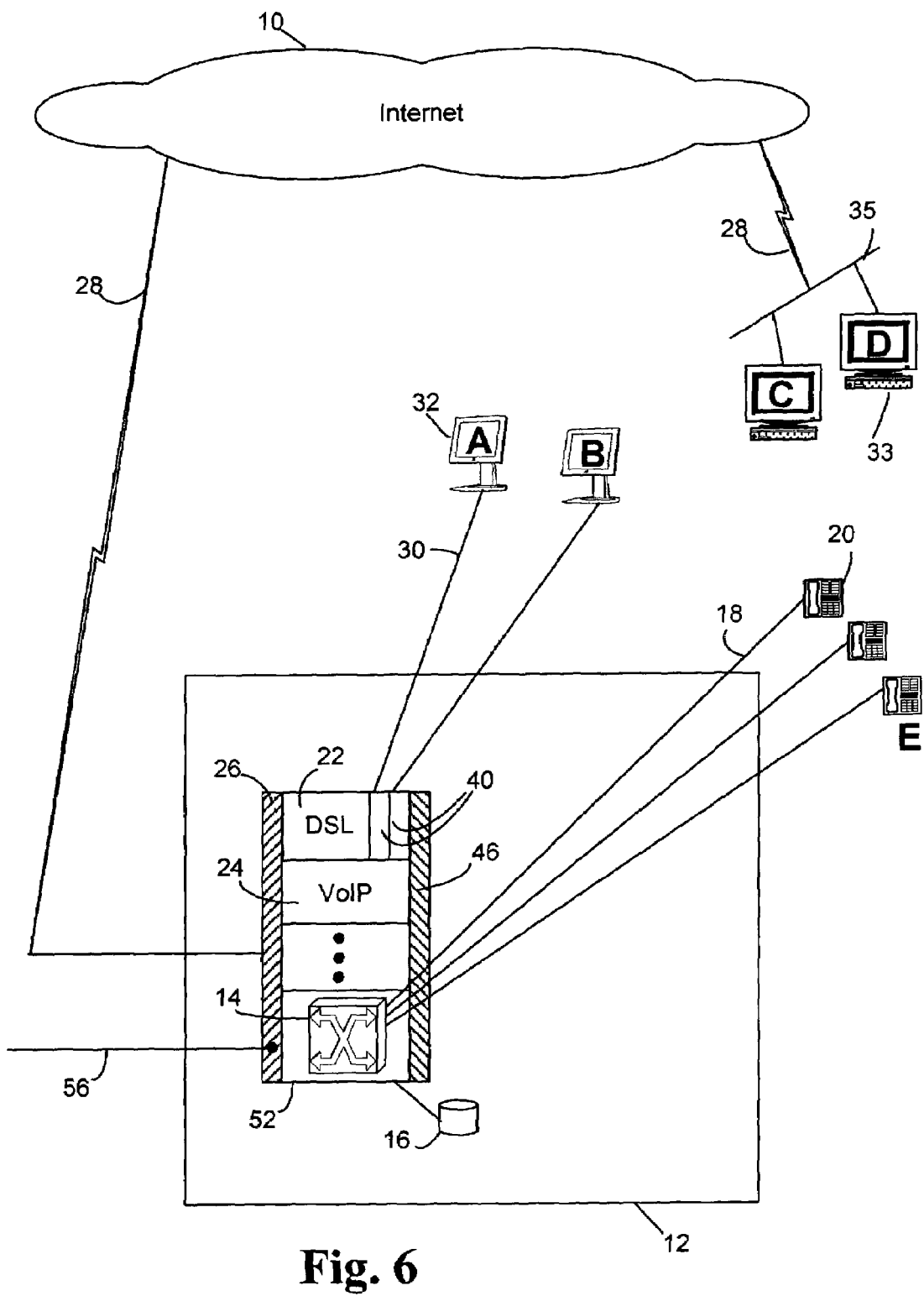
FIG. 6 is a schematic diagram illustrating an arrangement of the system shown in FIG. 5, simplified by consolidating all inter-central office data, voice, and messaging traffic onto a single communications link utilizing Internet Protocols.

In FIG. 6 there is illustrated the final stage of integration of the central office systems. Switching system 14 is a "pure packet" switch as previously described, having a packetization function (not shown) for packetizing conventional digitized voice. Since all voice data is transformed into packetized data suitable for transport by routers and over Internet compatible data communications links, there no longer is a need for voice communications channel 44—all voice is packetized and sent over the common router function 26 to its destination. All traffic routed to the Internet travels over Internet access link 28, as before. In previous examples wherein computer C calls Integrated Device A, switching system 14 was involved in processing the call setup message, but the resulting Internet communications bypassed the switching system. In those environments, as in the environment of FIG. 6, switching system 14 only transports conventional analog phone calls. As an example of this operation, assume that computer C calls phone E. The process is as in previous examples, with a digital call setup message being sent to the VoIP interface device, and then to switching system 14, which determines that E is an analog phone served by the switching system 14 itself. Once a connection is established between the two devices, switching system 14 now digitizes and packetizes the analog voice from phone E and sends it via the common router function 26 across the Internet to computer C. In the reverse direction, packetized voice being received from computer C is unpacketized and converted from digital to analog by switching system 14 before being delivered to phone E.

A very significant advantage results from this arrangement. Although not shown, SS7 messaging data, currently in X.25/X.75 packet format must be converted to operate on the Internet Protocols, or at least "wrapped" in an IP packet, which is readily accomplished. That being done, all voice, Internet data, and central office switching system-messaging communications between compatible central offices travel over inter-system composite link 56 in IP format. As in FIGS. 4 and 5, Internet data between compatible systems is then edge routed, in this circumstance being transmitted over inter-system composite link 56. Since all data is in IP format, inter-system composite link 56 could connect directly to the Internet, using the Internet as a transport medium between elements of the PSTN. Preferentially, however, inter-system composite link 56 avoids the congested public Internet and instead connects to other elements of the PSTN. Multiplexed voice trunking 36 and messaging communications circuit 38 are eliminated, and all communications of the PSTN are transformed to be in the same form as those of the Internet. The Internet and the PSTN are thus transformed into one single network. The majority of data is edge routed for maximum efficiency. Integration of the Internet and the PSTN enables the traditional communications to take place as well as richer, multimedia communications, and affords operators of "private" Internets the opportunity to guarantee performance levels for their clients and subscribers.

Having thus described the invention in rather full detail, it will be understood that such detail need not be strictly adhered to, but that further changes and modifications may suggest themselves to one skilled in the art falling within the scope of the present invention as defined by the subjoined claims.

What is claimed is:

1. For use in a telephone central office system of the Public Switched Telephone Network (PSTN), a central office system, comprising:
   (a) a switching system providing telephone service to client subscriber devices for placing and receiving telephone calls on the PSTN;
   (b) connection means associated with said switching system for receiving a connection from the PSTN to place and receive telephone calls;
   (c) a central office switching system interface device for providing Internet and telephony services to client devices capable of placing or receiving calls on the PSTN, said interface device providing an interface between said client devices of said interface device and said switching system;
   (d) a plurality of said interface devices integrated into an assembly of interface devices comprising an integrated interface device system, said integrated interface device system further comprising:
      (i) a messaging communications circuit connected to each of said interface devices and to said switching system;
      (ii) an IP protocol router function (a router) connected to said interface devices, and having means for connecting to the Internet;

(iii) telephone call-carrying connectivity to Integrated Devices, said Integrated Devices being client devices of said integrated interface device system, and said Integrated Devices being user communications devices incorporating a display screen, having an associated telephone number, and having a connection to the Internet with an associated IP address, said Internet connectivity provided by said router function;

(iv) said telephone call-carrying connectivity to said Integrated Devices arranged such that connections between calling and called devices are established telephonically by one Integrated Device dialing said associated telephone number of another Integrated Device on the PSTN;

(v) said Integrated Devices having a data messaging connection to said integrated interface device for carrying call setup and call control messages, said messages being arranged to carry telephone number and IP address information associated with said Integrated Devices;

(vi) a telephony communications channel connected to each of said interface devices and to said switching system, said telephony communications channel carrying telephone calls between client devices of said interface devices and said switching system; and (vii) a records system for maintaining service records of said client devices of said interface devices of said integrated interface device system, said records including telephone number and IP address information of said client devices, and said records system being available to at least one of said interface devices of said integrated interface device system;

(e) said central office system having means for enabling a calling device to establish an Internet communication with a called device by dialing its telephone number, wherein either of said calling and called devices are an Integrated Device and are a client of one of said interface devices or of said switching system; and (f) wherein said means for enabling a calling device to establish an Internet communication with a called device by dialing its telephone number is a messaging communications means, operating with said messaging communications circuit, said messaging communications means conveying call setup and call management messages to include Internet Protocol (IP) address information of a calling or called device and said messaging means interfacing to the PSTN SS7 messaging system which further conveys said call setup and call management messages to other switching systems on the PSTN.

2. A central office system as recited by claim 1, wherein said messaging communications means is connected to said client devices of said integrated interface devices and of said switching system.

3. A central office system as recited by claim 2, wherein said messaging communications means is operational in multiple modes, such as an SS7 mode with said switching system, and an ISDN or ADSI mode with said client devices.

4. A central office system as recited by claim 1, wherein said means for enabling a calling device to establish an Internet communication with a called device by dialing its telephone number further comprises means for obtaining the IP address of one of said calling and called devices and providing said IP address to a second of said calling and called devices, said providing of said IP address to said second of said calling and called devices being accomplished via said messaging communications means.

5. A central office system as recited by claim 1, wherein said messaging communications means is operational with the PSTN SS7 network.

6. A central office system as recited by claim 1, wherein said messaging communications means is operational with ISDN.

7. A central office system as recited by claim 1, wherein said messaging communications means is operational with ADSI.

8. A central office system as recited by claim 1, wherein said messaging communications means is the Internet.

9. A central office system as recited by claim 1, wherein said client devices are Integrated Devices, each having an Internet connection and a telephone number, the Internet connection having an associated Internet Protocol (IP) address, and the telephone number having an associated telephone connectivity, such that a connection for said Integrated Devices is established by telephonically dialing said telephone number via the PSTN, said Integrated Devices being operational with said messaging communications means.

10. A central office system as recited by claim 1, wherein said integrated interface device system is remote from an associated telephone central office, and has means for connecting to a switching system of said remote central office by circuits.

11. A central office system as recited by claim 1, wherein said means for enabling a calling device to establish an Internet communication with a called device by dialing its telephone number further comprises means for completing a conventional telephone call over the PSTN between said calling and called devices if an Internet communication between said calling and called devices cannot be achieved.

12. A central office system as recited by claim 1, wherein said means for enabling a calling device to establish an Internet communication with a called device by dialing its telephone number further comprises means for carrying audio aspects of a communication over the PSTN and visual or graphical aspects over the Internet.

13. A central office system as recited in claim 1, said messaging communications circuit further having means for receiving a connection from other elements of the PSTN.

14. A central office system as recited in claim 1, said records system being remote from said central office system.

15. A central office system as recited by claim 1, further comprising:
  (a) said integrated interface devices being edge devices to the Internet;
  (b) said router for routing Internet data between a calling client device of one of said interface devices and a called client device of another of said interface devices, wherein said Internet data is associated with an Internet communication established by said calling device, calling the telephone number of said called device; and
  (c) said routing between edge devices of the Internet being edge-routing and transporting Internet data directly among said edge devices.

16. A central office system as recited by claim 1, further comprising:
  (a) said Internet router having means to receive a connection from a second Internet router;
  (b) said second Internet router being connected to a second integrated interface device system in a second telephone central office;

(c) one of said calling and called devices being a client of a first of said integrated interface device systems and a second of said calling and called devices being a client of said second integrated interface device systems;

(d) said integrated interface device systems being edge devices to the Internet; and (e) said connection means between said router and said second router being appointed for edge-routing Internet data between said routers, said Internet data being associated with an Internet communication established by said calling device calling the telephone number of said called device, and said edge-routing transporting Internet data directly among said edge devices.

17. A central office system as recited by claim 1, wherein said switching system packetizes voice communications for analog telephone devices in Internet Protocol format for routing by said router.

18. For use in a telephone central office system of the Public Switched Telephone Network (PSTN), a central office system, comprising:

(a) a switching system providing telephone service to client subscriber devices for placing and receiving telephone calls on the PSTN;

(b) connection means associated with said switching system for receiving a connection from the PSTN to place and receive telephone calls;

(c) a central office switching system interface device for providing Internet and telephony services to client devices capable of placing or receiving calls on the PSTN, said interface device providing an interface between said client devices of said interface device and said switching system;

(d) a plurality of said interface devices integrated into an assembly of interface devices comprising an integrated interface device system, said integrated interface device system further comprising:

(i) a messaging communications circuit connected to each of said interface devices and to said switching system;

(ii) an IP protocol router function (a router) connected to said interface devices, and having means for connecting to the Internet;

(iii) telephone call-carrying connectivity to Integrated Devices, said Integrated Devices being client devices of said integrated interface device system, and said Integrated Devices being user communications devices incorporating a display screen, having an associated telephone number, and having a connection to the Internet with an associated IP address, said Internet connectivity provided by said router function;

(iv) said telephone call-carrying connectivity to said Integrated Devices arranged such that connections between calling and called devices are established telephonically by one Integrated Device dialing said associated telephone number of another Integrated Device on the PSTN;

(v) said Integrated Devices having a data messaging connection to said integrated interface device for carrying call setup and call control messages, said messages being arranged to carry telephone number and IP address information associated with said Integrated Devices; and (vi) a telephony communications channel connected to each of said interface devices and to said switching system, said telephony communications channel carrying telephone calls between client devices of said interface devices and said switching system;

(e) said central office system having means for enabling a calling device to establish an Internet communication with a called device by dialing its telephone number, wherein either or both of said calling and called devices are a client of one of said interface devices or of said switching system; and (f) wherein said means for enabling a calling device to establish an Internet communication with a called device by dialing its telephone number is a messaging communications means said messaging communications means conveying call setup and call management messages to include Internet Protocol (IP) address information of a calling or called device, wherein said switching system and said integrated interface device system are further assembled into an integrated central office system, and said central office system further comprises:

(g) a messaging communications circuit connected to each of said interface devices and to said switching system and being operational with said messaging communications means;

(h) an IP protocol router function (a router) connected to said interface devices and to said switching system, and having means for connecting to the Internet;

(i) a telephony communications channel connected to said interface devices and to said switching system, for carrying telephone calls between client devices of said interface devices and said switching system.

19. A central office system as recited in claim 18, said messaging communications circuit further having means for receiving a connection from other elements of the PSTN.

20. A central office system as recited in claim 19, said messaging communications circuit further accommodating messages in IP format.

21. A central office system as recited by claim 18, wherein said switching system packetizes voice communications in Internet Protocol format for routing by said router to other integrated central office systems.

22. A central office system as recited by claim 21, wherein said packetizing of voice communications is accomplished for voice communications of conventional analog telephone devices.

23. A central office system as recited in claim 18, said records system being remote from said integrated central office system.

24. A central office system as recited by claim 18, wherein:

(a) said integrated central office systems are edge devices to the Internet;

(b) said router routes Internet data between a calling client device of one element of said integrated central office systems and a called client device of another element of said integrated central office systems, said Internet data being associated with an Internet communication established by said calling device calling the telephone number of said called device; and (c) said routing between edge devices of the Internet being edge-routing and transporting Internet data directly among said edge devices.

25. A central office system as recited by claim 18, wherein:

(a) said Internet router has means for receiving a connection from a second Internet router;

(b) said second Internet router is connected to a second integrated central office system in a second telephone central office;

(c) one of said calling and called devices is a client of a first of said integrated central office systems and a second of said calling and called devices is a client of said second integrated central office systems;

(d) said integrated central office systems are edge devices to the Internet; and (e) said connection means between said router and said second router is appointed for edge-routing Internet data between said routers, said Internet data being associated with an Internet communication established by said calling device calling the telephone number of said called device, and said edge-routing transporting Internet data directly among said edge devices.

* * * * *